(12) United States Patent
Lipp et al.

(10) Patent No.: US 6,751,238 B1
(45) Date of Patent: Jun. 15, 2004

(54) PHASE RE-ALIGNMENT OF SONET/SDH NETWORK SWITCH WITHOUT POINTER MANIPULATION

(75) Inventors: Robert J. Lipp, Los Gatos, CA (US); Phillip P. Hughes, Menlo Park, CA (US)

(73) Assignee: Aztech Partners, Inc., Plano, TX (US)

( * ) Notice: Subject to any disclaimer, the term of this patent is extended or adjusted under 35 U.S.C. 154(b) by 0 days.

(21) Appl. No.: 09/553,501

(22) Filed: Apr. 20, 2000

(51) Int. Cl.⁷ ............................................... H04J 14/08
(52) U.S. Cl. ........................ 370/541; 370/394; 370/516
(58) Field of Search .............................. 370/355, 374, 370/394, 395.51, 395.62, 395.71, 508, 510, 512, 516, 518, 519, 537, 540, 541

(56) References Cited

U.S. PATENT DOCUMENTS

| | | | |
|---|---|---|---|
| 5,142,529 A | 8/1992 | Parruck et al. | 370/84 |
| 5,335,223 A | 8/1994 | Iino | 370/65.5 |
| 5,390,180 A | 2/1995 | Reilly | 370/84 |
| 5,471,476 A | 11/1995 | Hiramoto | 370/105.1 |
| 5,563,877 A * | 10/1996 | Van Tetering et al. | 370/419 |
| 5,717,693 A | 2/1998 | Baydar et al. | 370/514 |
| 5,809,032 A | 9/1998 | Weeber et al. | 370/517 |
| 5,812,290 A | 9/1998 | Maeno et al. | 359/117 |
| 5,883,900 A * | 3/1999 | Chopping | 370/506 |

* cited by examiner

*Primary Examiner*—Huy D. Vu
*Assistant Examiner*—Justin Philpott
(74) *Attorney, Agent, or Firm*—Stuart T. Auvinen

(57) ABSTRACT

A large network switch has switch elements distributed across several chassis separated by perhaps several hundred meters. A generated sync pulse arrives at different switch elements at different times, creating skew. The latency of data through the network switch is set to match the frame period of SONET frames. SONET frames are adjusted at the ingress ports to align the data pointer to the beginning of the frame. The frame is divided along row boundaries into separate cell-packets that are routed across the switch fabric to the egress port. The packets are held in a buffer at the egress port until the next frame begins with the next sync pulse. Upon receiving the next sync pulse, the frame is transmitted. No pointer adjustment is needed by the egress port. A row number is used as a sequence number for the cell-packet to allow the egress port to re-order the cell-packets when transmitting the frame. Since no pointer manipulation is needed at the egress port, pointer management is simplified.

26 Claims, 8 Drawing Sheets

INPUT PORT

OUTPUT PORT

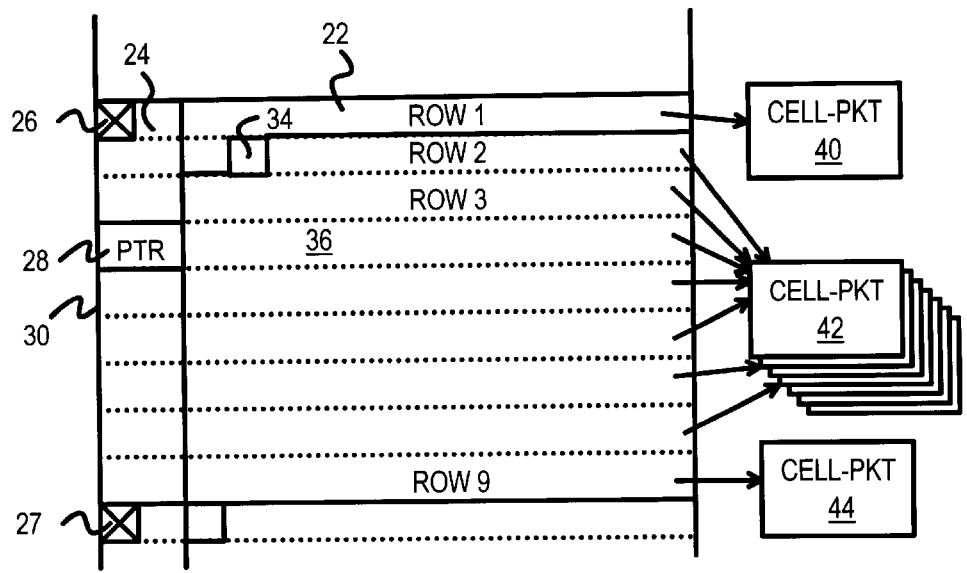
FIG. 4A  INGRESS PORT
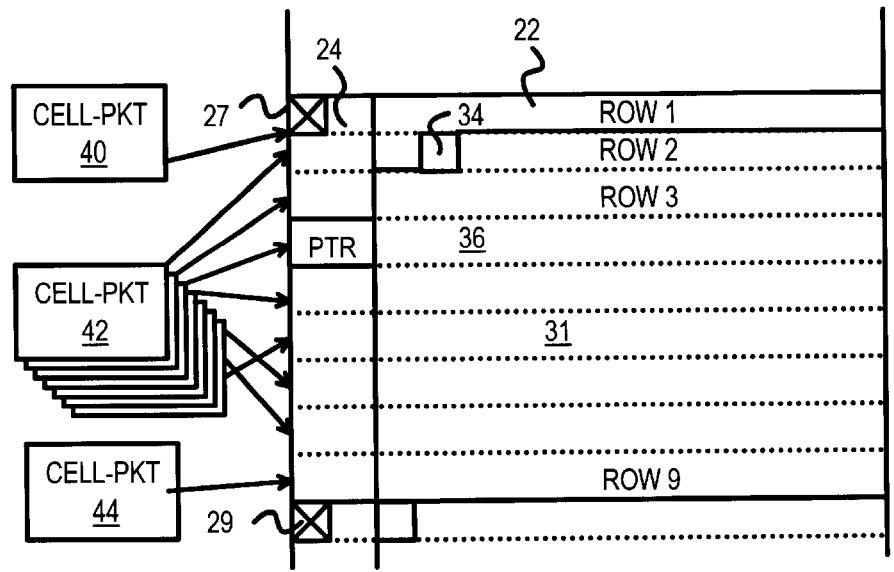
FIG. 4B  EGRESS PORT

PHASE RE-ALIGNMENT OF SONET/SDH NETWORK SWITCH WITHOUT POINTER MANIPULATION

FIELD OF THE INVENTION

This invention relates to network switch systems, and more particularly to phase adjustment without pointer manipulation for Synchronous Optical NETwork (SONET) frames.

BACKGROUND OF THE INVENTION

Very high bandwidth network links such as fiber-optic backbone trunks are connected to other communication links by network switches. These network switches carry such high data bandwidths and switch among so many ports that many separate chassis may be required to contain all parts of the network switch. These many chassis can be separated from each other by tens or even hundreds meters. Optical or electrical signals travelling over cables between chassis can have propagation delays of about 5 nanoseconds (ns) per meter.

A popular network standard for such high-bandwidth optical communication trunks is Synchronous Optical NETwork (SONET). Data is arranged into SONET frames that are timed by a sync pulse that occurs once for each frame, every 125 µsec. For the SONET OC-48 standard operating frequency, one bit is sent every 0.4 ns. A chassis-to-chassis cable delay of 400 ns represents a delay of 1,000 bits. Maintaining the phase of the data to the sync pulse is critical for SONET frames, yet propagation delays are much larger than the data periods. An almost identical format called Synchronous Digital Hierarchy (SDH) is used in most of the world outside of the United States. For purposes of this invention, SONET and SDH are inseparable. Whenever the term SONET is used herein, it is meant to be inclusive of SDH.

FIG. 1 highlights varying data and sync-pulse propagation delays in a multi-chassis network switch. Chassis 12, 14, 15, 16, 18 are elements of network switch 20 that contains several different chassis separated by several meters or even several hundreds of meters. Sync-clock generator 10 generates a sync clock pulse for all chassis elements at network switch 20. The sync pulse is distributed from sync-clock generator 10 to each of chassis 12, 14, 15, 16, 18. The sync pulse is used for timing interface to the external network and to recover the SONET frame at the ingress port and to define the boundaries of the SONET frame at the egress port. It is not used for internal chassis-to-chassis data flow.

A propagation delay occurs from the generation of the sync pulse by sync pulse generator 10 until the sync pulse is received by chassis 12, 14, 15, 16, 18. For example, W chassis 12 is close to sync pulse generator 10 and thus receives the sync pulse after a delay of only 1. However, X chassis 14 is located farther away from sync pulse generator 10 and receives the sync pulse after a delay of 2. Chassis Y is even more remote from sync pulse generator 10 and receives the sync pulse after a longer delay of 4.

Data traveling among chassis 12, 14, 15, 16, 18 also experience propagation delays. For example, data being sent from W chassis 12 to X chassis 14 experiences a delay of 2, as does data traveling in the reverse direction, from X chassis 14 to W chassis 12. Likewise data traveling in either direction between X chassis 14 and Y chassis 16 experiences a delay of 2.

A SONET data stream may originate from two different ingress ports and be combined and output by a single egress port. For example, a secondary stream may be input to chassis 15, while a primary stream is input to chassis 12. The streams from chassis 12, 15 are both sent to chassis 14. The two streams are combined at chassis 14. However, each stream can have a different skew. For example, the primary data stream from chassis 12 has a delay of 3, while the secondary data stream from chassis 15 has a delay of only 2. This relative skew also needs compensation.

FIG. 2A is a table of phase skews between data and the sync pulse in the network switch of FIG. 1. The departure/arrival times of the sync clock and data at chassis W, X, Y of FIG. 1 are shown in the table, for data being sent from chassis W to chassis Y through chassis X. It is assumed that the chassis output the data with little delay.

The sync clock arrives with a delay of 1 at chassis W, a delay of 2 at chassis X, and a delay of 4 at chassis Y. The data is not transmitted from ingress chassis W until the sync clock is received by chassis W, after a delay of 1. The data requires an additional delay of 2 to arrive at chassis X, and another delay of 2 to arrive at chassis Y. Thus the data arrives at chassis X at time 3 (1+2) and at chassis Y at time 5 (1+2+2).

While there is zero skew at ingress chassis W, the skew between the data and sync pulse is 1 at chassis X and Y. In general, when the data travels in the same direction as the sync pulse, the skews are relatively small since the propagation delays for the sync pulse and the data are about the same at any chassis.

FIG. 2B is a table of phase skews between data and the sync pulse in the network switch of FIG. 1 for data traveling in a reverse direction. As before, the sync clock arrives with a delay of 1 at chassis W, a delay of 2 at chassis X, and a delay of 4 at chassis Y.

In this example, data is transmitted in the reverse direction, from chassis Y to chassis W through chassis X. The data is transmitted from chassis Y once the sync clock is received by chassis Y, after a delay of 4. The data requires an additional delay of 2 to arrive at chassis X, and another delay of 2 to arrive at chassis W. The data therefore arrives at chassis X at time 6 (4+2) and at chassis W at time 8 (4+2+2).

The skew at any chassis is the difference in the sync clock arrival time and the data departure/arrival time. For chassis W, the data arrives at time 8, but the clock arrives at time 1 since chassis W is close to the sync clock generator but far from the ingress port (chassis Y). The skew is 7 (8−1). For chassis X, data arrives at time 6 while the sync clock pulse arrives at time 2. The difference or skew is 4. Chassis Y, the ingress port, has a zero skew since the data is not transmitted out the egress port until the sync pulse arrives at time 4. Any data arriving at an ingress port of chassis 16 and delivered to an egress port of chassis 16 both use the same delayed sync pulse to recover and send the SONET frame respectively.

Since the data travels in the opposite direction as the sync pulse, the skews are large and increase until the egress port is reached. In a typical network switch, a delay of 1 might correspond to 500 ns, so that the worst-case skew is 3.5 µsec. This is a very large skew.

SONET Frame and Pointer—FIGS. 3A–B

FIG. 3A shows a SONET frame at an ingress port. Each SONET frame 30 begins with a sync pulse 26. Each SONET frame has an overhead portion 24 and a data payload portion 22. The overhead portion is regenerated at each egress port in each chassis in network switch 20 and is initiated by the sync pulse 26. Data payload portion 22 and overhead portion 24 together contain 810 data bytes divided into 9 rows of 90 bytes in each row. Each frame 30 begins with sync pulse 26, which occurs every 125 μsec.

The data bounded by bytes 34 is known as a Synchronous Payload Envelope (SPE). The SPE 36 floats relative to the boundary of SONET frame 30. Overhead portion 24 includes data pointer 28 that points to the delayed first data byte 34 in Synchronous Payload Envelope (SPE) 36. The delayed first data byte 34 does not have to be at the start of the frame, or the first data byte 32 on the first row of data payload portion 22. Instead, the start of the SPE data can float within a frame. The actual data for the SPE 36 starts with delayed first data byte 34 in the current frame, and extends across the frame boundary into the next SONET frame, and ends before delayed first data byte 34 in the next frame.

Pointers are adjusted to account for timing skew between the network and SONET systems. Pointers can also be adjusted for skew across a SONET system. FIG. 3B shows a SONET frame with pointer adjustment at an egress port. Propagation delays can cause skews between the data and the sync clock. The location of the first data byte 34 can be further delayed relative to the start of the frame 30, creating a relative phase shift of data to overhead. When this occurs, data pointer 28 can be set to the new (delayed) location of delayed SPE first data byte 34'. See U.S. Pat. No. 5,335,223 by Iino, assigned to Fujitsu.

The phase of the SPE 36' is indicated by data pointer 28 in overhead portion 24 of the output SONET frame. Skews within the switch can cause delayed first data byte 34 of FIG. 3A at the ingress port to be delayed to delayed first data byte 34' for SONET frame 30 of FIG. 3B when the frame is re-generated at an egress port of the network switch. Data pointer 28 can be adjusted to point to delayed first data byte 34' at the egress port to accommodate the skew. SPE 36 of FIG. 3A at the ingress port is delayed in phase to SPE 36' of FIG. 3B at the egress port.

While such pointer adjustment is useful, pointers may need to be adjusted at both the input and egress ports of a large network switch. For a large SONET stream, such as an OC-192, which may contain 192 STS-1 streams, up to 192 pointer adjustments would be needed. This requires a significant amount of logic with its attendant size, cost and power consumption. A large distributed cross-connect may require pointer adjustment at the ingress port to align all cross-connected STS-1 streams prior to cross-connecting. Even so, inter-chassis skew will offset the flows slightly such that they will not all have the same phase relationship with each other and the sync pulse at the egress port, so individual pointer adjustment of each STS-1 stream is again required at the egress to realign the flows.

What is desired is an improved phase adjustment method for a large network switch. It is desired to accommodate various skews when switch elements of a large network switch are located on separate chassis located several hundred meters apart. It is desired to eliminate pointer adjustment at the egress port. A simplified phase adjustment and skew accommodation scheme is desired. Skew tolerance for a SONET network switch is desired. Skew tolerance of data within a SONET frame using a packet-based network switch is desirable.

SUMMARY OF THE INVENTION

A skew-tolerant distributed network switch has a plurality of network interface ports that contain ingress ports, egress ports, and switch elements. The ingress ports are coupled to receive input data streams from external sources. The egress ports are coupled to transmit data streams over external links. The switch elements are coupled together and to the ingress and egress ports, forming a switch fabric for switching cell-packets from an ingress port to an egress port.

Each network interface port receives a clock pulse that is synchronized to the data streams. Different network interface ports receive the clock pulse with varying skews to the data streams.

Input buffers in the ingress ports buffer data from the input data streams. A packetizer is coupled to the input buffers. It forms cell-packets from the input data stream. The cell-packets are injected into the switch fabric by the ingress ports and routed to the egress ports through the switch elements.

The input data streams are organized into data frames that comprise one or more of the cell-packets. The clock pulse is for indicating a frame boundary in the input data streams.

Output buffers, in the egress ports, receive and store data from the cell-packets routed through the switch fabric. The cell-packets are re-ordered into a same sequence order as within the input data streams. Transmitters in the egress ports are coupled to the external links. They transmit data from the cell-packets stored in the output buffers over the external links.

Clock triggers receive the clock pulse and are coupled to the transmitters. They delay transmission of the data in the frames until a clock pulse is received by the clock trigger. Thus clock skews are tolerated by delaying transmission of the data from the egress ports until a next clock pulse is received.

In further aspects of the invention the cell-packets from a frame are formed and injected into the switch fabric after a first clock pulse is received by the ingress port, but before the next clock pulse is received by the ingress port. The cell-packets are received by the egress port before the next clock pulse. The next clock pulse is a next pulse after the first clock pulse. Thus the cell-packets are formed and routed through the switch fabric within one clock period.

In other aspects of the invention a header generator is coupled to the packetizer. It attaches a header to each cell-packet. The header includes an internal address of an egress port that the cell-packet is being routed to through the switch fabric, and a sequence number that indicates a sequence order of the cell-packet in the frame from the input data stream. The egress port removes the header from the cell-packet and uses the sequence number to re-order the cell-packet into the same sequence order as the input data stream. Thus internal headers are generated and attached to the cell-packets to indicate the sequence order of the cell-packets.

In still further aspects an offset clock pulse has a same frequency as the clock pulse but also has a phase offset from the clock pulse. Some of the network interface ports receive the offset clock pulse. Cell-packets from a frame are formed and injected into the switch fabric after a first clock pulse is received by the ingress port, but before the offset clock pulse is received by the ingress port. The cell-packets are received by the egress port before the offset clock pulse. Thus the cell-packets are formed and routed through the switch fabric within one clock period adjusted for a skew between the clock pulse and the offset clock pulse.

In further aspects the header of the cell-packets include a frame-sequence number that indicates a sequence order of the frame in a sequence of frames. Thus the frame-sequence number allows for ordering frames when phase offset exceeds one clock period.

BRIEF DESCRIPTION OF THE DRAWINGS

FIG. 4A shows SONET frames being divided into packets along row boundaries at the ingress port.

FIG. 4B shows cell-packets being re-grouped into SONET frames at the egress port.

DETAILED DESCRIPTION

The present invention relates to an improvement in synchronization of large network switches. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that timing skews in a large network switch can be accommodated by fixing internal switch latency to exactly match the frame time of a SONET frame, i.e. the sync pulse interval. This is in contrast to the standard method in which all the pointers are recalculated and readjusted at the egress ports to accommodate internal switch skew. In this case, the SONET frames from multiple sources and timing domains are adjusted at the ingress ports to align the data pointer to the common system timing reference, the sync pulse, of the network switch, which is identical for all chassis except for phase differences. The frame is next divided into separate packets that are routed across the switch fabric to the egress port. The packets are held in a buffer at the egress port until the next frame begins with the next sync pulse. Upon receiving the next sync pulse, the frame is transmitted. The data pointer is already correctly set as the SPE maintains its same relative location in this next SONET frame, so no pointer adjustment is needed by the egress port.

The inventors have further realized that packetization can preferably be performed along row boundaries of the SONET frame. Each row in the SONET frame becomes a separate packet that is routed through the switch fabric from the ingress port to the egress port. Such row-based packetization simplifies the switch design since a row is a well defined subset of a SONET frame. The first packet from the first row of the SONET frame is usually the first to arrive at the egress port, allowing plenty of time before transmission of the frame at the egress port at the start of the next frame with the next sync pulse. The data can arrive at the egress port with a large skew from the sync pulse without risk of data loss. Since later rows of the frame need not be transmitted until some time after the next sync pulse, these later packets can also tolerate much data transit delay and sync pulse skew.

Frame Packetization Along Rows—FIG. 4A

Figure 3A:
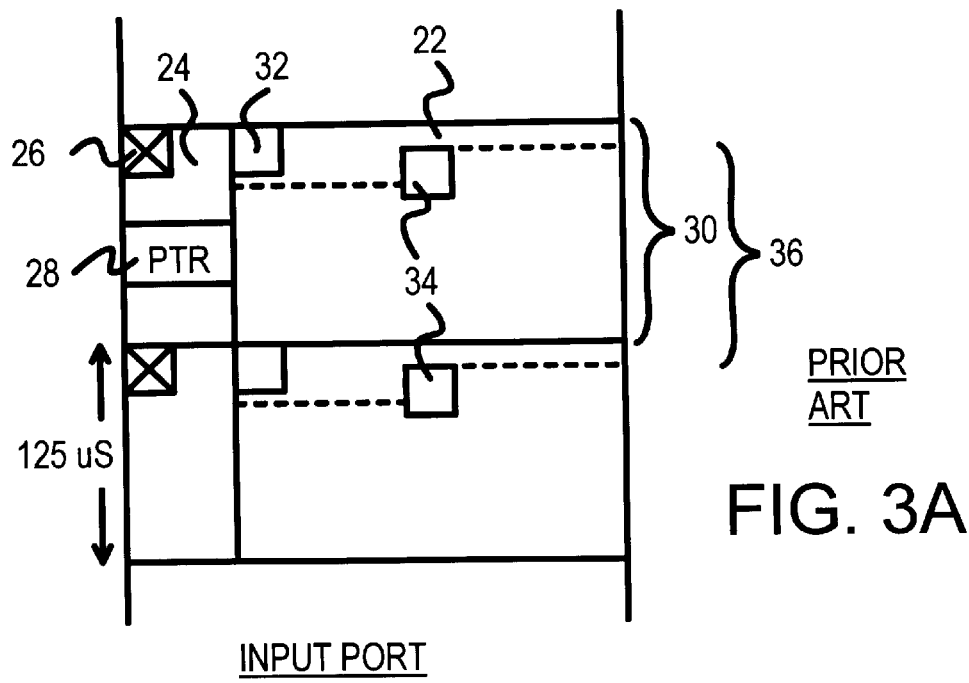
FIG. 3A shows a SONET frame.
Figure 3B:
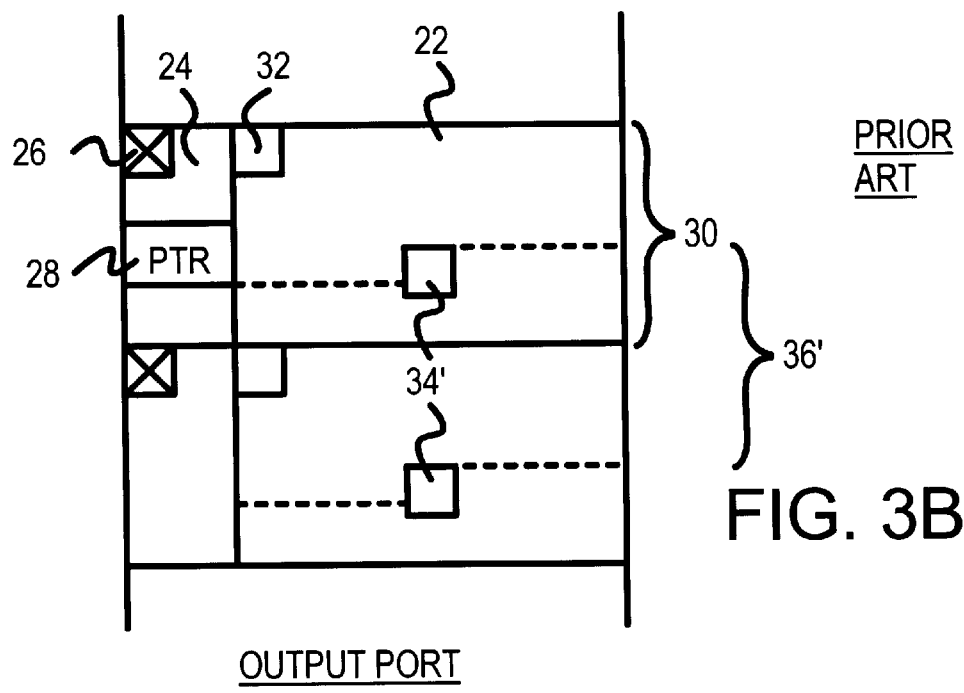
FIG. 3B shows a SONET frame with pointer adjustment.

FIG. 4A shows a detail of FIG. 3A in which SONET frames being divided into packets along row boundaries at the ingress port. The input or ingress port receives SONET frames from an external link, such as from a high-speed optical link to a remote location. Each SONET frame 30 begins with a sync pulse 26, while the next frame begins with the next sync pulse 27. Each frame 30 includes overhead portion 24 and data payload portion 22.

Data pointer 28 is located in overhead portion 24. Data pointer 28 points to the first data byte 34 in the SPE.

Data payload portion 22 and overhead portion 24 together contain 810 data bytes divided into 9 rows of 90 bytes in each row. Each frame 30 begins with sync pulse 26, 27 which occurs every 125 $\mu$sec. Higher data rates, such as OC-48, (generalized as OC-n), contain multiple byte interleaved frames, and can be thought of as a third dimension of similar parallel frames lined up behind the frame illustrated. Each row then contains a multiple of 90 bytes, such as 270 for OC-3 or 4320 for OC-48. In such cases, n multiple 90-byte packets, n being equal to the n in OC-n, are sent for every row.

The first row of frame 30 is formed into a payload of cell-packet 40. Bytes from both overhead portion 24 and data payload portion 22 of the first row are formed into the payload of cell-packet 40. A header for internal use by the network switch is attached to the payload, and cell-packet 40 is routed through the switch fabric among the switch elements until the output or egress port is reached. The header of cell-packet 40 contains an internal address of the egress port so intermediate switch elements can route cell-packet 40 toward its destination egress port.

The second row and other rows 3–8 from frame 30 are similarly formed into payloads of middle cell-packets 42. One middle cell-packet 42 is created for each row of frame 30. These middle cell-packets 42 are also routed from the ingress port through the switch fabric to the same egress port. However, a different route through the switch fabric can be taken for different cell-packets from the same frame 30, since each cell-packet is independently routed by the switch elements. These cell-packets can have different latencies caused by these different routes and therefore arrive out of order at the egress port.

Finally, the last (9th) row of frame 30 is formed into the payload of last cell-packet 44. Last cell-packet 44 is also routed from the ingress port to the egress port through the switch fabric.

Cell-Packets Re-Grouped into Frame at Egress Port—FIG. 4B

FIG. 4B shows cell-packets being re-grouped into a SONET frame at the egress port. The output or egress port receives cell-packets from other switch elements in the switch fabric to create the multiple frames byte-interleaved and output at the egress port.

The internal header attached to each cell-packet has a destination address that is an internal identifier for a switch element attached to the desired egress port. As each cell-packet is received by a switch element, the destination address is read from the internal header and compared to the internal address of the switch element. When the addresses match, the cell-packet has reached its destination and is re-grouped into a frame and output by the egress port attached to the switch element. When the addresses do not match, the switch element routes the cell-packet toward its destination through another switch element.

Each cell-packet 40, 42, 44 is eventually received by the egress port and stored in a buffer. The cell-packets are reordered using a row number that is stored in the internal header of each cell-packet. For example first cell-packet 40 was from the first row, and has a row identifier in its header specifying the first row of the frame. Additionally, an identifier in the header (not shown) identifies which of the multiple byte interleaved OC-n egress frames the row is destined for. The first packet of the first input frame is being output at the egress port at about the same time as the first packet from the next frame is being input at the ingress port. The packets from the first frame cannot therefore get confused with packets from the next frame, as long as the time to accumulate the payload for the first frame packet is greater than any skews in the system. For the preferred embodiment, it takes one-ninth of a frame time, about 14 $\mu$s, to accumulate this data. To accommodate larger skews, a frame counter of any size can be used to generate a serial number for inclusion in the header, which then can be used to organize the outgoing packets in frame order. The payload from this first cell-packet 40 becomes the first row of output frame 31. Middle cell-packets 42 are also re-ordered to the correct row order indicated by their internal headers, and their payloads become overhead portion 24 and data payload portion 22 of rows 2–8 of output frame 31. The last row 9 of output frame 31 is formed from the payload of last cell-packet 44. The cell-packets are delayed by one frame period by the network switch, producing a latency of one frame period. This allows the frame packets to have a propagation delay of almost ⅛ths of a frame period for a 9-row frame.

The cell-packets 40, 42, 44 are put in row order but held in the buffer at the egress port until the next sync pulse 27 is received from the internal sync-pulse generator at the network switch. When this next sync pulse 27 arrives at the egress port, output frame 31 begins to be transmitted over the external link driven by the egress port. The first row is transmitted first, followed by the other rows until the last row (9) is transmitted. The last cell-packet 44 can arrive late, after next sync pulse 27, without error, as long as last cell-packet 44 arrives before the time that row 9 is to be transmitted.

The data pointer was set to point to the beginning of the frame by the ingress port, and it remains aligned when output frame 31 is transmitted over an external link by the egress port. Thus no pointer manipulation is required by the egress port.

Figure 5:
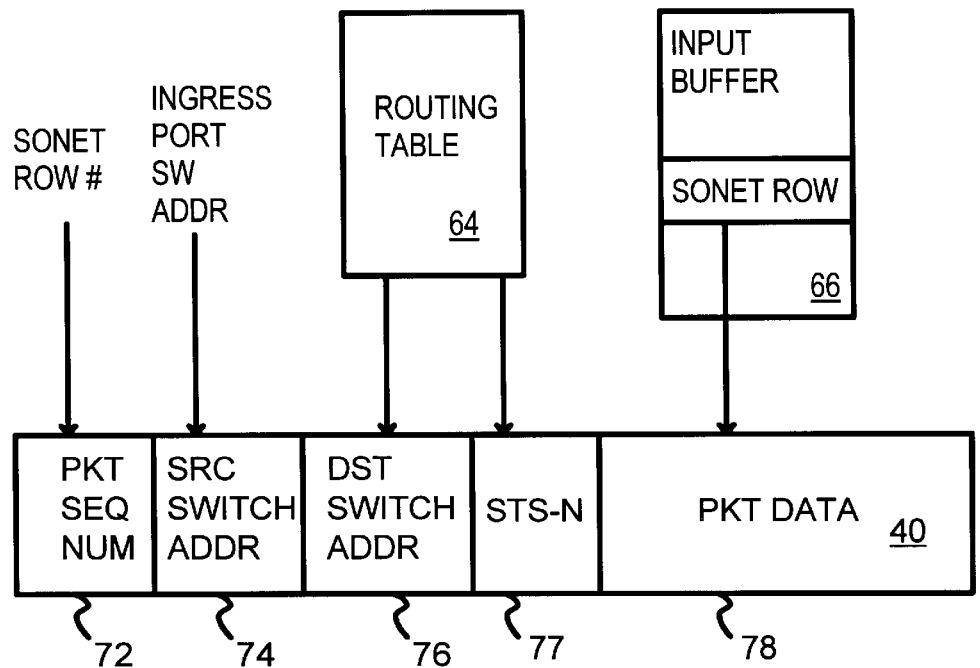
FIG. 5 shows a cell-packet and its internal header.

Cell-Packet and Internal Header—FIG. 5

FIG. 5 shows a cell-packet and its internal header. Cell-packet 40 contains payload 78 that is loaded with the 90 bytes in a row of a frame, including the overhead and data payload portions of the SONET frame. The incoming frame is stored by the ingress port in input buffer 66 after the pointer is aligned, if necessary. Data and overhead bytes are read from input buffer 66, one SONET row per cell-packet 40. Of course, input buffer 66 can have physical memory rows of other lengths and perform multiple reads per SONET row, or multiple rows per packet.

The row number (1–9 or binary machine representation 0–8) of the row in the SONET frame is written to row number field 72 of the internal header. This row number is used as a packet sequence number to re-order the cell-packets at the egress port to identify when they should be transmitted from the egress port relative to the sync pulse. The internal identifier or address of the switch element attached to the ingress port is written to source field 74. This is an internal address that distinguishes one switch element from others at the network switch and is used for error checking purposes.

Routing table 64 outputs the internal identifier or address of the switch element attached to the selected egress port. This internal address is written to destination field 76 in the internal header of cell-packet 40. Routing table 64 also outputs the egress port STS-n value to the STS output field 77 to indicate the output STS-n frame the packet is destined for. Cell-packet 40 is then routed from the ingress port to the egress port through intermediate switch elements of the network switch. Once cell-packet 40 arrives at a switch element with an internal address matching the destination address in destination field 76, cell-packet 40 is removed from the switch fabric and sent to the egress port. The internal header including fields 72, 74, 76, 77 are removed by the egress port, while the payload 78 becomes one row of the SONET frame output over the external link.

Figure 6:
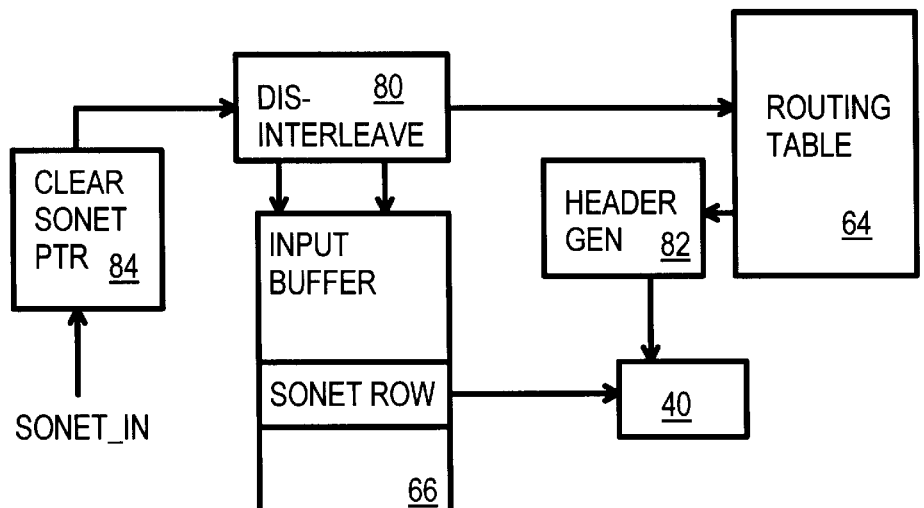
FIG. 6 shows formation of cell-packets at an ingress port.

Packetization and Data Alignment at Ingress Port— FIG. 6

FIG. 6 shows formation of cell-packets at an ingress port. A series of SONET frames are received from an external link. Input pointer aligner 84 reads the data pointer from the overhead portion of each frame and aligns the pointer to the sync pulse. If the pointer is already aligned, the frames are passed through input aligner 84 without adjustment.

The frames are sent from pointer aligner 84 to dis-interleaver 80. Dis-interleaver 80 de-multiplexes the byte interleaved SONET frames into multiple parallel frames when higher data rates are used, such as OC-48. Each of the multiple parallel frames is a basic STS-1 SONET frame of 810 bytes. Each of these parallel frames is divided into 9 cell-packets, one per row, and their packets are sent through the switch fabric to the egress port(s).

The dis-interleaved frames are stored in input buffer 66. Each row of each of the perhaps parallel frames is formed into a cell-packet 40. The frame overhead and data payload bytes in the frame's row are read from input buffer 66 and form the payload 78 of cell-packet 40. Header generator 82 forms an internal header that is attached to payload 78 to form cell-packet 40. This header includes the row number, source and destination address fields shown in FIG. 5. Other fields may be added to the header for routing management purposes, such as an age field. Routing table 64 is used to find the destination addresses for packets generated from this series of SONET frames. Each basic STS-1 frame is divided into 9 cell-packets 40, each carrying one of the 9 rows of the basic frame.

Figure 7:
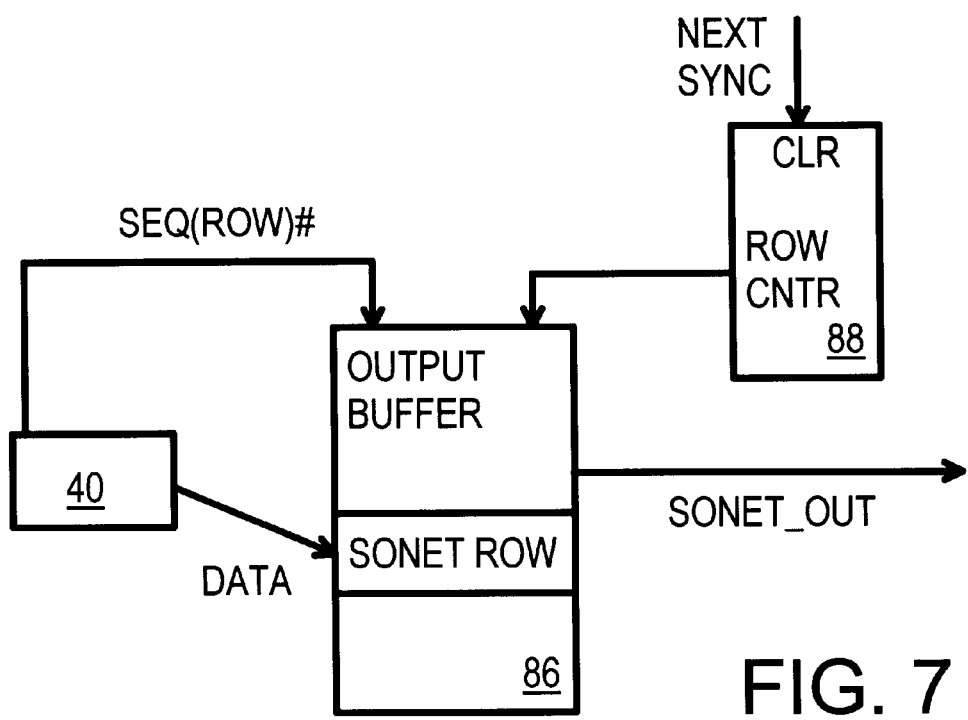
FIG. 7 shows frame formation from cell-packets at an egress port.

Frame Formation at Egress Port—FIG. 7

FIG. 7 shows frame formation from cell-packets at an egress port. Cell-packets 40 are received by the switch element and its egress port identified by the internal destination address in the internal header of cell-packets 40. The row number and STS number fields in the internal header of cell-packet 40 are read to determine which row and STS frame the packet is destined for. The row number is used as an index or offset into output buffer 86 when the payload of cell-packet 40 is written into output buffer 86. Using the row number of each cell-packet 40 as an index when writing output buffer 86 causes the data to be re-arranged into the row order for the frame. This simplifies formation of the frame at the egress port.

When the next sync pulse is received from the sync clock generator of the network switch, row counter 88 is reset to the first row of the frame. Row counter 88 is used to form an address to read frame data out of output buffer 86. When the sync pulse resets row counter 88, the first row is read from output buffer 86 and is transmitted over the external link driven by the egress port. Once all bytes in the row have been read, row counter 88 advances to point to the next row in output buffer 86. This next row is then transmitted. Row counter 88 again advances and the third row is read from output buffer 86 and transmitted. This continues until the last row is read from output buffer 86 and transmitted. Then the next sync pulse arrives and resets row counter 88 to the first row of the next frame, and the process is repeated for the next frame.

When higher rate frames are used, a multiplexer or re-interleaver can be added (not shown) before or after output buffer 86 to form the higher-rate frame. More complex row or sequence numbers can be used to re-arrange the parallel rows. There may be multiple buffers 86 for multiple frames, or there may be a central memory with all frames combined, or any combination. The row counter may be a simple row counter or a more complex memory addressing scheme suitable for multiple or central memory architectures.

Figure 8:
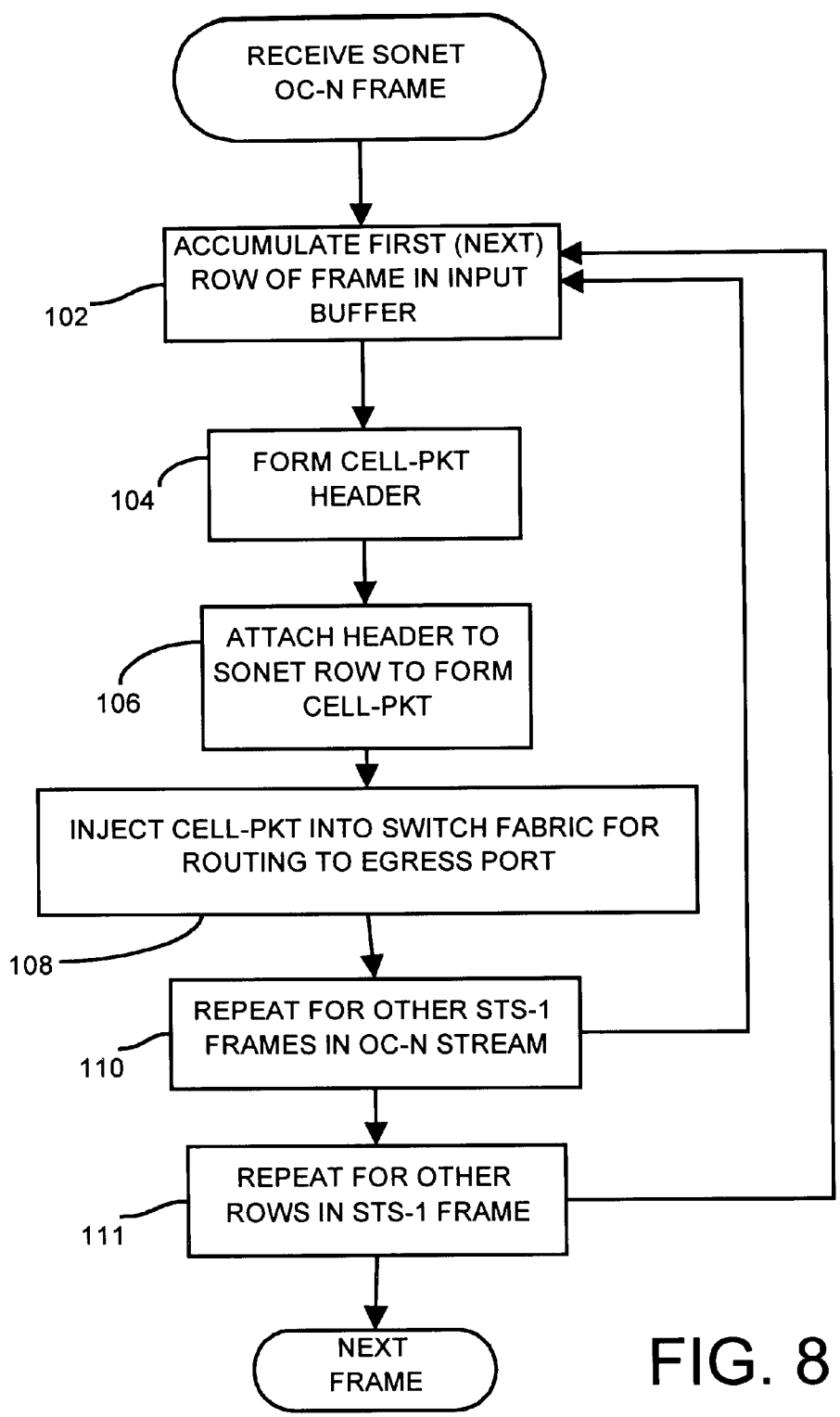
FIG. 8 is a flowchart of the packetization of SONET frames into cell-packets at an ingress port to the network switch.

Packetization Process at Ingress Port—FIG. 8

FIG. 8 is a flowchart of the packetization of SONET frames into cell-packets at an ingress port to the network switch. As each SONET frame(s) in a series of frames is received by the ingress port from an external link, the overhead and data bytes for the first row of the frame(s) are received and de-multiplexed in the ingress port's input buffer, step 102. The first frame's pointer is aligned and the internally-used header for the first cell-packet is formed, step 104, using a routing table and the row number within the frame. The internal header is attached to the data and overhead bytes from the first row of the frame, step 106, to form the cell-packet.

The cell-packet is injected into the switch fabric by the switch element connected to the ingress port, step 108. This process, steps 102–108, is repeated for the first packet from the first frame from the next STS-1 in the OC-n stream, step 110. The process is then repeated for all frames in the OC-n stream. This whole process is then repeated again for the second cell-packet of each frame, and then from the third through ninth cell-packets respectively, step 111, until all rows in the frame are formed into cell-packets and injected into the switch fabric.

The process of packetization and fabric injection then is repeated for the next frame in the series. Each cell-packet is routed through the switch fabric after injection and eventually arrives at the egress port.

Figure 9:
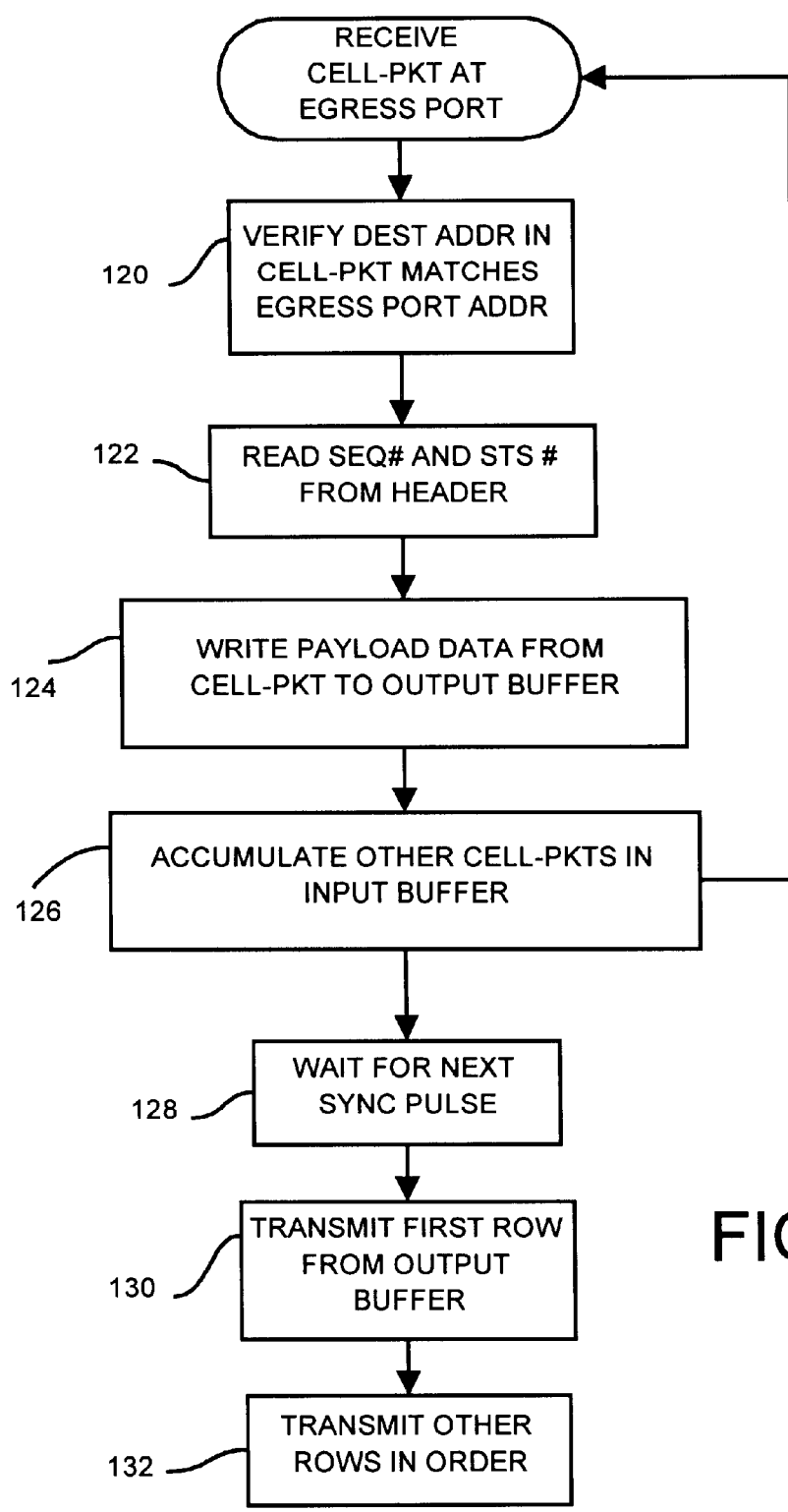
FIG. 9 is a flowchart of packets being formed into frames at the egress port.

Frame Formation at the Egress Port—FIG. 9

FIG. 9 is a flowchart of packets being formed into frames at the egress port. The cell-packets can be received at the egress port in any order after being routed through the switch fabric. The switch element attached to the egress port reads the destination address from the cell-packet's internal header and verifies that the cell-packet's destination address matches the switch's address, step 120. The row sequence number and STS number are then read from the internal header of the cell-packet, step 122. The payload portion of the cell-packet is then written to the output buffer of the egress port using the row and STS numbers as an index to address the location written in the output buffer by the payload, step 124. The internal header can be dropped.

The payload portion written to the output buffer contains both the overhead and data portions of one of the rows in the frame. As other cell-packets are received, their payloads are also written to a location in the output buffer identified by the row number and STS number fields of the cell-packet's header, as steps 120–124 are repeated (step 126).

Figure 1:
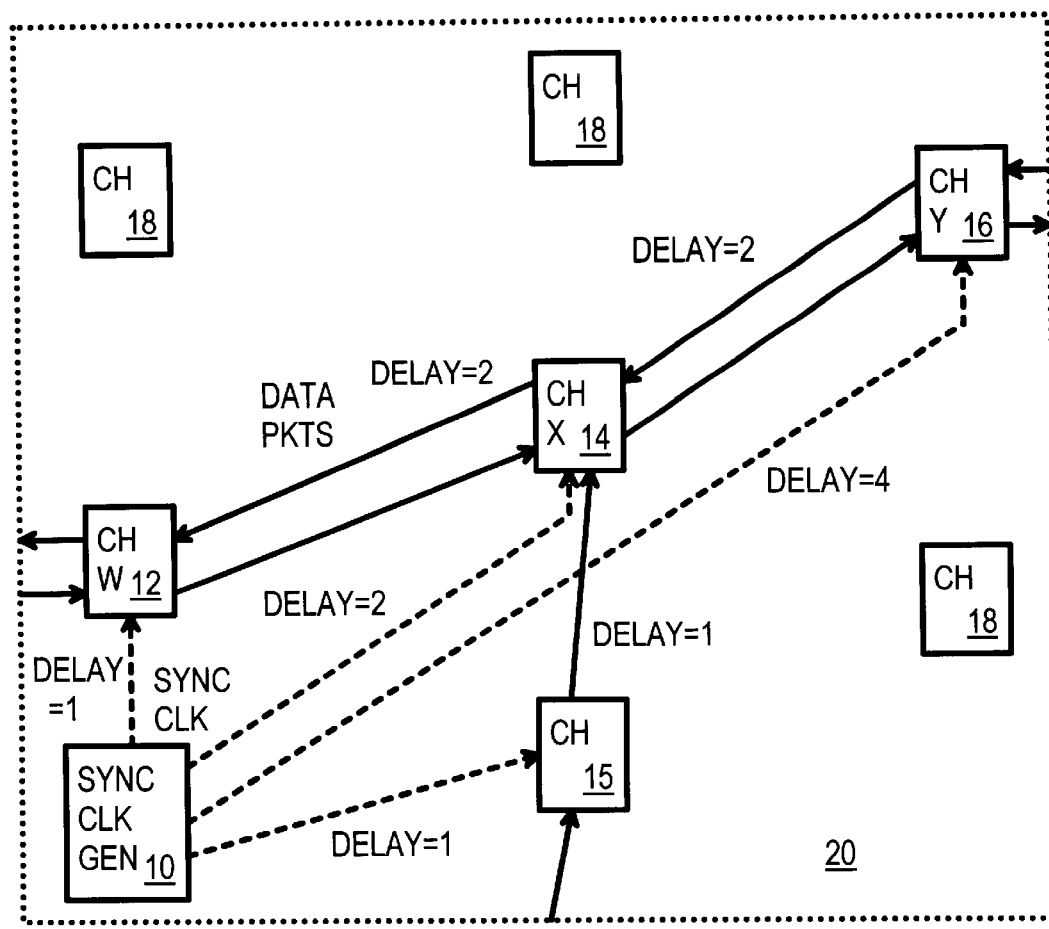
FIG. 1 highlights varying data and sync-pulse propagation delays in a multi-chassis network switch.
Figure 2A:
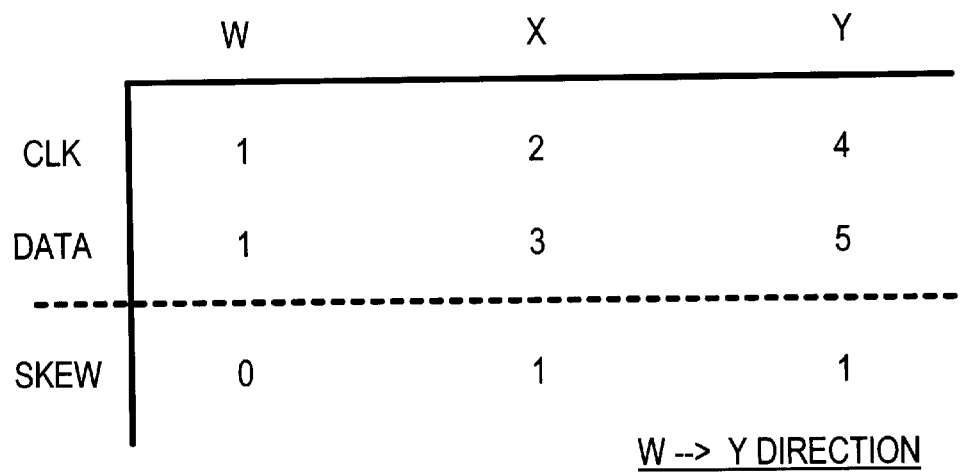
FIG. 2A is a table of phase skews between data and the sync pulse in the network switch of FIG. 1.
Figure 2B:
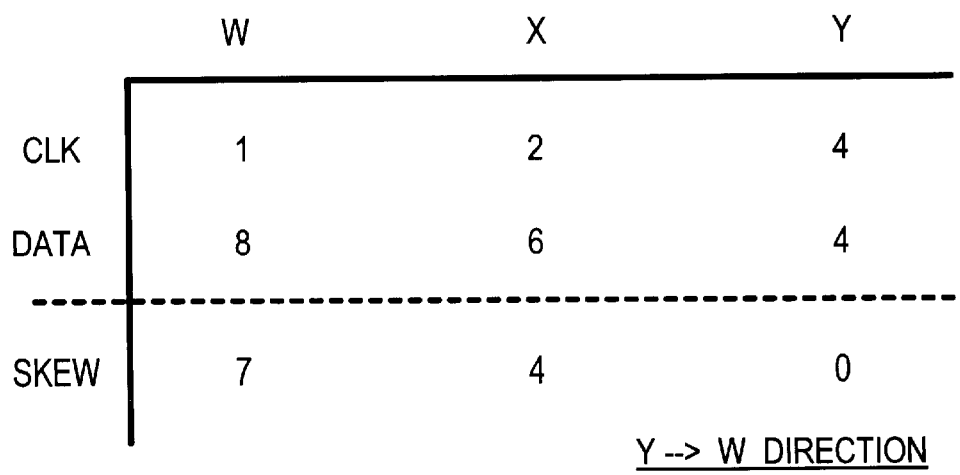
FIG. 2B is a table of phase skews between data and the sync pulse in the network switch of FIG. 1 for data traveling in a reverse direction.

The egress port waits for the next sync pulse to be received from the clock generator at the network switch, step 128. This sync pulse is received by different egress ports at different times because of skews described in FIGS. 1 and 2A,B. Since the first row of the frame is the first cell-packet injected and routed through the switch fabric, it is likely that the first row's cell-packet is one of the first received. Even with clock skew, the first row cell-packet is very likely to have been received before the next sync clock pulse occurs.

The next sync pulse triggers the egress port to begin transmitting the OC-n frame(s) in a byte interleaved manner, starting with the first overhead byte of the first row of the first STS frame, step 130. Once all overhead and data bytes in the first row have been read from the output buffer and transmitted over the external link, the next row is read from the output buffer and transmitted. Other rows are also read from the output buffer and transmitted, step 132. Once the last row is read and transmitted, the next sync pulse should arrive, and the process is repeated for the next frame.

ADVANTAGES OF THE INVENTION

The phase adjustment method can tolerate clock/data skews of a large network switch. Large skews can be accommodated even when switch elements of a large network switch are located on separate chassis located several hundred meters apart. Pointer adjustment at the egress port is eliminated, simplifying the egress ports. Skew tolerance for a SONET network switch is achieved.

Since cell-packets are generated for each of 9 rows in a SONET frame, the first row can be packetized and routed to the egress port without waiting for the rest of the frame. The delay to accumulate one row in the input buffer and send the first cell-packet is thus only 1/9th of a frame period, or about 14 $\mu$sec (125/9). The allowed skew is one frame period, minus the row accumulation time, minus the propagation time for the cell-packet through the switch fabric. Since the frame period is 125 $\mu$sec, and maximum propagation delays can be 5–10 $\mu$sec, the allowed skew is 125–14–10 or about 100 $\mu$sec. This is a large skew tolerance.

Output pointer adjustment is eliminated or, as in an alternative embodiment, reduced to a simple common adjustment of all pointers. In the preferred embodiment, all SONET OC-n streams are de-multiplexed into individual STS-1 streams. SONET permits concatenating streams into higher data rates such as OC-12c where the appended "c" indicates a concatenated stream. In a concatenated OC-nc stream, the nc number of streams are combined together as a single (SPE) payload, not n separate payloads. Separate STS frames and payloads are logically non-separable and require a single payload pointer adjustment in the STS number 1 frame only, indicating where the entire concatenated payload starts. The preferred embodiment does not distinguish between concatenated and non-concatenated multiplexed SONET streams. Concatenated streams are handled in the same manner as non-concatenated multiplexed streams. The dis-interleaver and input buffer packetize the stream in an identical manner. The stream undergoes a virtual de-multiplexing of a concatenated stream into virtual frames. The concatenated stream is reassembled in exactly the same manner at the egress port as it was disassembled at the ingress port, and without any changes to the header or payload. The concatenated stream is reassembled without requiring interpreting whether the stream is thus concatenated, and making different pointer adjustments accordingly. This further reduces complexity.

ALTERNATE EMBODIMENTS

Several other embodiments are contemplated by the inventors. For example various combinations and types of logic and firmware or software can be used to implement functions described herein. The row counter could count for several frames in a sequence of frames, rather than being reset for each frame. The row sequence number stored in the internal header could have both a row number within a frame, and a frame number within a sequence of frames. Nested counters could be used—a row counter and a frame counter. Further counters could be used for dis-interleaving and re-interleaving multiple parallel frames for higher frame rates. Various encoding schemes can be used, such as for the row number. For example, the row number could be in a gray-code sequence rather than in a binary sequence.

Delay could be other than a single SONET frame. It could be longer to increase permitted packet transit time (latency) of the system, or shorter to reduce latency for higher performance systems. A fixed adjustment could be made at the egress port to all pointers rather than interpreting the pointer than making an adjustment. Or the sync pulse could be offset to accommodate a different system delay. For example, if the first egress sync pulse were delayed 60 $\mu$s, this first delayed sync pulse could be used to transmit the outgoing data, rather than use the next sync pulse. Alternately, after the input pointer is aligned to the payload at the ingress, it could be offset a fixed amount, either smaller or larger, before it is written into the SONET header, to account for a fixed, but not the standard 125 $\mu$s frame delay.

Different packet sizes could be employed other than 90 bytes. Smaller packet sizes are better for lower system latency, while larger packets reduce internal bandwidth requirements by having a lower header/payload overhead ratio.

The SPE and payload could also be packetized and sent separately. This has the advantage of being able to easily read and change the data in selected overhead bytes, such as the SONET DCC communication channel. Most of the SONET frame overhead is terminated and does not need to be transmitted from the ingress port to the egress port. Not transmitting this overhead information saves system bandwidth.

For a system with separate SPE packetization, overhead bytes can be sent out-of-band. That is, they can be sent from the ingress port to the egress port though another communication channel other than the fabric, for example, through a microprocessor mediated interface or inter-processor communication path.

Future SONET systems likely will have even higher data rates, and these larger frames can be used with the invention by dis-interleaving the high-rate frame into several STS-1 or STS-3 frames that are processed as described earlier. The separate STS-1 frames can each be divided into cell-packets and routed to the same egress port, or cell-packets for one STS-1 frame can be sent to one egress port while other STS-1 frames from the same STS-48 frame can be routed to alternate egress ports to split the frame traffic to different links. In this manner, multiple lower speed OC-n streams can be multiplexed into larger OC-n streams, or the reverse. For example, a local metro loop may have multiple OC-3 links that are combined by this network switch into an OC-48 link to be delivered to a common destination. The termination network switch would then separate them into discrete OC-3 links for local delivery at the destination. Or in a system with multiple network switches, OC-3 links could be added and dropped along the way.

In another variation, the input pointer alignment could be further simplified or eliminated. The pointer could be read and set to zero (or some other fixed predefined value) at the ingress port. Packetization could begin at the first (zero) byte of the SPE (or other value adjusted by this predetermined pointer setting). In this embodiment it is preferable to packetize the overhead and SPE payload separately. SPE packets would be held at the ingress port till the sync pulse and then start to be introduced into the switch fabric at a constant rate of one SPE per frame time. This is difficult to implement in a system with different input and output clock frequency domains as byte stuffing will be required to interface between the domains and the pointer will need to be adjusted regularly over time. It is therefore only easily accomplished if the ingress and egress frequencies are identical, which is a common configuration in line-timed SONET systems.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A skew-tolerant distributed network switch comprising:
  a plurality of network interface ports containing:
    ingress ports, coupled to receive input data streams from external sources;
    egress ports, coupled to transmit data streams over external links;
  switch elements, coupled together and to the ingress and egress ports, to form a switch fabric for switching cell-packets from an ingress port to an egress port;
  each network interface port receiving a clock pulse that is synchronized to the data streams, wherein different network interface ports receive the clock pulse with varying skews to the data streams;
  input buffers, in the ingress ports, for buffering data from the input data streams;
  a packetizer, coupled to the input buffers, for forming cell-packets from the input data stream, the cell-packets being injected into the switch fabric by the ingress ports and routed to the egress ports through the switch elements;
  wherein the input data streams are organized into data frames that comprise one or more of the cell-packets;

wherein the clock pulse is for indicating a frame boundary in the input data streams;

output buffers, in the egress ports, for receiving and storing data from the cell-packets routed through the switch fabric, the cell-packets being re-ordered into a same sequence order as within the input data streams;

transmitters, in the egress ports and coupled to the external links, for transmitting data from the cell-packets stored in the output buffers over the external links; and clock triggers, receiving the clock pulse, and coupled to the transmitters, for delaying transmission of the data in the frames until a clock pulse is received by the clock trigger;

wherein the cell-packets from a frame are formed and injected into the switch fabric after a first clock pulse is received by the ingress port, but before the next clock pulse is received by the ingress port;

wherein the cell-packets are received by the egress port before the next clock pulse;

wherein the next clock pulse is a next pulse after the first clock pulse, whereby the cell-packets are formed and routed through the switch fabric within one clock period and whereby clock skews are tolerated by delaying transmission of the data from the egress ports until a next clock pulse is received.

2. The skew-tolerant distributed network switch of claim 1 further comprising:

a header generator, coupled to the packetizer, for attaching a header to each cell-packet, the header including:
an internal address of an egress port that the cell-packet is being routed to through the switch fabric;
a sequence number, indicating a sequence order of the cell-packet in the frame from the input data stream;

wherein the egress port removes the header from the cell-packet and uses the sequence number to re-order the cell-packet into the same sequence order as the input data stream, whereby internal headers are generated and attached to the cell-packets to indicate the sequence order of the cell-packets.

3. The skew-tolerant distributed network switch of claim 2 further comprising:

an offset clock pulse, having a same frequency as the clock pulse but also having a phase offset from the clock pulse;

wherein some of the network interface ports receive the offset clock pulse;

wherein cell-packets from a frame are formed and injected into the switch fabric after a first clock pulse is received by the ingress port, but before the offset clock pulse is received by the ingress port;

wherein the cell-packets are received by the egress port before the offset clock pulse;

whereby the cell-packets are formed and routed through the switch fabric within one clock period adjusted for a skew between the clock pulse and the offset clock pulse.

4. The skew-tolerant distributed network switch of claim 3 wherein the header of the cell-packets further comprise:

a frame-sequence number, indicating a sequence order of the frame in a sequence of frames;

whereby the frame-sequence number allows for ordering frames when phase offset exceeds one clock period.

5. The skew-tolerant distributed network switch of claim 2 wherein the packetizer forms a first cell-packet after a first clock pulse is received;

wherein the clock trigger causes the transmitter to start transmitting a first cell-packet of a previous frame, the transmitter then transmitting other cell-packets in order, whereby the first cell-packet at an ingress port is injected no sooner than a start of transmission at the egress port of the first cell-packet of the previous frame.

6. The skew-tolerant distributed network switch of claim 2 wherein the ingress port further comprises:

a routing table, for generating the internal address of the egress port for the cell-packets in response to an external destination for the data stream, whereby the cell-packets are routed through the switch fabric.

7. The skew-tolerant distributed network switch of claim 6 wherein the input data stream is a Synchronous Optical NETwork (SONET) data stream and the frame is a SONET frame, wherein the clock pulse is a SONET sync pulse, whereby SONET sync-pulse skew is tolerated by delaying transmission at the egress port until a next SONET sync pulse.

8. A The skew-tolerant distributed network switch of claim 7 wherein the input data stream is a SONET data stream in an OC-n format having n interleaved STS-1 frames between each pair of clock pulses, wherein n is a positive integer;

wherein the header of the cell-packet also includes:
a STS-n number, indicating an interleave number of a STS-1 frame in an OC-n input data stream for the cell-packet;

wherein the egress ports re-order the cell-packets using the sequence number that indicates a packetization order and the STS-n number that indicates the interleave order of the cell-packets, whereby interleaved SONET frames are packetized, routed through the switch fabric, and re-ordered.

9. The skew-tolerant distributed network switch of claim 8 wherein the packetization order is an order of data rows in a frame.

10. The skew-tolerant distributed network switch of claim 9 wherein the input data stream contains a plurality of data rows between each pair of clock pulses, wherein each data row contains an overhead data portion and a payload data portion;

wherein the packetizer attaches the header to a cell payload formed from the overhead and payload data portions of one data row in the input data stream, whereby one cell-packet is formed for each data row.

11. The skew-tolerant distributed network switch of claim 10 wherein the sequence number in the header of the cell-packets is a data row number indicating a data row of the input data stream that contains the overhead and payload data portions of the payload within the cell-packet, whereby data row numbers indicate the sequence order.

12. The skew-tolerant distributed network switch of claim 10 wherein the overhead data portion of a frame includes a pointer, the pointer indicating a start of a Synchronous Payload Envelope (SPE) that is not aligned to a first byte of the frame;

wherein the cell-packets are re-ordered based on the packetization order within the frame;

wherein the cell-packets are transmitted from the egress port using the clock pulse whereby the pointer and the SPE remain unchanged on the SONET frame at the egress port.

13. The skew-tolerant distributed network switch of claim 10 wherein the overhead data portion of a frame includes a pointer, the pointer indicating a start of a Synchronous Payload Envelope (SPE) that is not aligned to a first byte of the frame;

wherein the cell-packets are re-ordered based on the packetization order within the frame;

wherein the cell-packets are transmitted from the egress port using the clock pulse;

wherein the egress ports adjust the pointer by a common amount, whereby the SPE is shifted by a common amount for all egress ports.

14. The skew-tolerant distributed network switch of claim 13 further comprising:

an offset clock pulse, having a same frequency as the clock pulse but also having a phase offset from the clock pulse;

wherein the frame is a SONET frame;

wherein the overhead data portion of the SONET frame has a pointer that points to the first byte of the SPE;

wherein the pointer is further adjusted at the ingress port by an amount equal to the phase offset between the clock pulse and the offset clock pulse, whereby the pointer requires no further adjustment at the egress port.

15. The skew-tolerant distributed network switch of claim 7 wherein an amount of time to packetize one cell-packet in the input buffer is greater than any skews for the clock pulse to any network interface port.

16. The skew-tolerant distributed network switch of claim 7 wherein the cell-packet contains either overhead portion data or payload data portion data of a frame, but not data from both portions;

wherein cell-packets for the overhead data portions are re-ordered separately from the cell-packets for the payload data portion.

17. The skew-tolerant distributed network switch of claim 16 wherein the payload data portion and bytes of the overhead data portion that contain a pointer are formed into cell-packets, wherein unnecessary overhead bytes are not formed into cell-packets and injected into the switch fabric.

18. A method for switching data streams in a network switch having clock skews comprising:

at an ingress port to the network switch,
    receiving a data stream divided into frames synchronized to a sync pulse;
    accumulating a first data packet of a frame of the data stream into an input buffer;
    determining a destination address for the data stream, the destination address being an internal address of a switch node coupled to an egress port of the network switch;
    generating an internal header that contains the destination address and a sequence number that indicates the first data packet of the frame;
    attaching the internal header to the first data packet of the frame to form a first cell-packet;
    injecting the first cell-packet into a switch fabric at the network switch;

(a) accumulating a next data packet of the frame into the input buffer;
    (b) generating a next internal header that contains the destination address and a sequence number that indicates the next data packet of the frame;
    (c) attaching the next internal header to the next data packet of the frame to form a next cell-packet;
    (d) injecting the next cell-packet into a switch fabric at the network switch;
    repeating (a) to (d) for all next data packets in the frame;
    routing the first cell-packet and the next cell-packets through the switch fabric to an egress port using the destination address in the internal headers;
at the egress port,
    receiving cell-packets from the switch fabric in any order;
    reading the sequence number from the internal header of each cell-packet received;
    accumulating in an output buffer data packets extracted from the cell-packets wherein the sequence number from the internal header is used to re-order the data packets from the cell-packets;
    waiting for a next sync pulse to be received at the egress port to indicate a start of a next frame;
    wherein the period of the sync pulse is greater than the sum of clock skew and cell-packet transmission latency from the ingress port to the egress port:
    when the next sync pulse is received at the egress port, transmitting over an external link the first data packet from the output buffer; and
    when the first data packet has been transmitted, transmitting over the external link the next data packet from the output buffer and transmitting other next data packets for the frame in an order determined by the sequence numbers from the internal headers;
whereby skews of the network switch are eliminated.

19. The method of claim 18 wherein the data streams are Synchronous Optical NETwork (SONET) data streams and the frame is an STS-1 frame or a plurality of STS-1 frames interleaved together.

20. The method of claim 19 wherein the data packets are data rows of an STS-1 frame.

21. The method of claim 19 further comprising:

at the ingress port, once the first data packet has been accumulated for a first STS-1 frame,
    (f) accumulating an interleaved data packet of an interleaved STS-1 frame of the data stream into an input buffer,
    (g) generating an internal header that contains the destination address and a sequence number that indicates the first data packet of the frame and an interleave number that indicates the interleaved data packet;
    (g) attaching the internal header to the interleaved data packet to form a cell-packet;
    (i) injecting the cell-packet into a switch fabric at the network switch; and
    repeating (f)–(i) for other interleaved data packets before accumulating the next data packet of the first STS-1 frame,
whereby frames are dis-interleaved before being formed into cell-packets.

22. The method of claim 21 further comprising:

at the egress port,
    using the interleave number and the sequence number to re-order cell-packets received at the egress port, whereby data packets and frame interleaves are re-ordered for transmission over the external link.

23. The method of claim 22 wherein the data streams are concatenated SONET data streams;

wherein concatenated frames of the concatenated SONET data stream are dis-interleaved at the ingress port so as to create virtual STS-1 frames; and wherein the virtual STS-1 frames are formed into data packets and injected into the switch fabric, whereby the data packets are re-ordered at the egress port to recreate the concatenated SONET data stream.

24. The method of claim 20 wherein the first cell-packet is formed from Synchronous Payload Envelop (SPE) data, the SPE data packet starting at a location indicated by a pointer, the pointer being a SONET header pointer value;

wherein the first cell-packet is injected into the switch fabric after the first sync pulse occurring after the cell-packet is formed, wherein the pointer at the egress port is set to a pre-determined value;

wherein the data packets are re-ordered at the egress port starting at the location within the SONET frame that was specified by the pre-determined value of the pointer;

whereby the pointer needs no further adjustment at the egress port.

25. The method of claim 19 wherein determining the destination address comprises accessing an internal routing table.

26. A Synchronous Optical NETwork (SONET) network switch comprising:

ingress ports, coupled to receive input data streams from external sources;

wherein the input data streams are segmented into SONET frames, each SONET frame having a header containing a pointer with a value that indicates a location of a start of a SONET Synchronous Payload Envelop (SPE) within the SONET frame;

egress ports, coupled to transmit data streams over external links;

switch means, coupled together and to the ingress and egress ports, to form a switch fabric, for switching cell-packets from an ingress port to an egress port;

the ingress ports, egress ports, and switch means receiving a synchronization clock pulse, wherein different the synchronization clock pulse is received with varying skews at the ingress and egress ports;

an ingress port having:

link means for receiving a data stream divided into SONET frames and for synchronizing the frames to the synchronization clock pulse by first aligning the pointer to the synchronization pulse;

buffer means for accumulating a first data packet of a SONET frame of the data stream;

header means for generating an internal header that contains an internal destination means for indicating an egress port and sequence means for indicating a sequence order for the first data packet of the SONET frame;

packet means for attaching the internal header to the first data packet of the SONET frame to form a cell-packet;

packet injection means, coupled to the packet means, for injecting the first cell-packet into a switch fabric at the network switch;

wherein the buffer means accumulates other data packets after the first data packet, the header means generates a sequence number indicating an order for the data packet within the SONET frame, and the packet means forms other cell-packets containing the other data packets, the other packets injected into the switch fabric by the packet injection means;

the egress port having:

output buffer means, coupled to the switch means in the switch fabric, for receiving cell-packets from the switch fabric in any order;

re-order means, coupled to the output buffer means, for reading the sequence means from the internal header of each cell-packet received, and for re-ordering the data packets from the cell-packets in an order indicated by the sequence means;

delayed transmit means, coupled to receive the synchronization clock pulse, for waiting for a next synchronization clock pulse to be received at the egress port before transmitting over an external link a first re-ordered data from the output buffer means; and continuous transmit means, coupled to the delayed transmit means, and triggered when the first re-ordered data has been transmitted, for transmitting over the external link a next re-ordered data from the output buffer means and transmitting other next re-ordered data for the SONET frame in an order determined by the sequence means;

wherein the cell-packets from a SONET frame are formed and injected into the switch fabric after a first synchronization clock pulse is received by the ingress port, but before the next synchronization clock pulse is received by the ingress port;

wherein the cell-packets are received by the egress port before the next synchronization clock pulse;

wherein the next synchronization clock pulse is a next pulse after the first synchronization clock pulse, whereby the cell-packets are formed and routed through the switch fabric within one clock period and whereby SONET frames are transmitted out the egress port at the next synchronization clock pulse without changing the pointer value after the initial alignment.

* * * * *